2,898,310

HIGHLY-BASIC ANION EXCHANGE RESINS FROM EPIHALOHYDRINS AND TERTIARY - AMINO CONTAINING ALKYLENEPOLYAMINES

Albert H. Greer, Haddonfield, N.J., assignor to Pfaudler Permutit Inc., New York, N.Y., a corporation of Delaware No Drawing. Application August 8, 1956
Serial No. 602,929

18 Claims. (Cl. 260—2.1)

The present invention relates to novel, synthetic, polymeric, highly-basic anion exchange compositions, and to a novel process for their preparation. This invention also relates to a method for removing both weak and strong anions from an aqueous solution.

More particularly, the highly-basic anion exchange resins of the present invention are condensation products of an epihalohydrin and an alkylenepolyamine, the latter having at least one tertiary amino group. Optionally, but preferably, any non-quaternized amine sites in the resulting condensation product may be quaternized by treatment with a quaternizing agent.

Anion exchange resins, in order to be satisfactory for use, must be substantially insoluble in water, dilute acids and alkalis. They must be capable of resisting physical transformation, such as undue swelling, or mechanical disintegration, such as spalling or shattering of the resin beads, when in contact with the solution they are used to treat. They should not discharge color during the anion exchange cycle and they should be chemically stable in the presence of the aqueous solutions to be treated and strongly alkaline regeneration solutions. They must also have a high useful or operating capacity for removing anions from aqueous solutions, and be capable of being repeatedly regenerated for reuse when they become exhausted. It is also highly desirable that in addition to a high operating capacity, the exchange resin shall have a high capacity for removing the weaker anions from solution, such as silica and carbon dioxide. The present invention makes it possible to obtain anion exchange resins which have a significant enhancement in the ability to remove weak anions from solution and physical strength, as well as concomitant improvement in other desirable properties, over those of anion exchange resins produced from polymers of a similar character.

It is an object of the present invention to provide novel anion exchange resins which possess a high capacity for the removal of weak and strong anions from an aqueous solution and which may be produced by a single-step chemical condensation.

It is another object of the present invention to provide novel anion exchange resins which possess superior basicity values and operating capacities over those of anion exchange resins which are somewhat related chemically.

It is an additional object of the present invention to provide a novel process for producing spheroidally-shaped polymeric resins which are condensation products of an epihalohydrin and a particular type of alkylenepolyamine, which type of resins normally have low basicities and low capacities for adsorbing weakly acidic anions, to provide highly-basic anion exchange resins of superior basicity values and operating capacities.

It is a further object of the present invention to provide a process for removing weakly acidic anions, such as silica and carbon dioxide from aqueous solutions.

Other objects will be apparent to those skilled in the art from a reading of the description which follows.

Anion exchange resins produced by condensing an epihalohydrin and a polyalkylenepolyamine have been known for a few years. Such resins are described in U.S. Patent No. 2,469,683 of James R. Dudley et al., and U.S. Patent No. 2,469,692 of Lennart A. Lundberg et al. These patents describe the preparation of anion exchange resins by condensing an epihalohydrin with a polyalkylenepolyamine, such as tetraethylene pentamine (containing only primary and secondary amino groups). These anion exchange resins provided a significant advancement in the art at the time. They did not, however, possess as high a basicity value, i.e., capacity for removal of weak anions, such as silica, bicarbonate and carbonate, as might be desired. Michael Patent No. 2,543,666 states at column 2, lines 48–54, that such resins have a basicity or salt-splitting capacity of only 1.5–2.0 kilograins per cubic foot.

U.S. Patent No. 2,543,666 of Malden W. Michael provided an improvement in some respects over the resins of the Dudley et al. and Lundberg et al. patents. The Michael patent proposed to increase the basicity values, or salt-splitting capacities, of the epichlorohydrin-polyalkylenepolyamine resins of the Dudley et al. and Lundberg et al. patents by quaternizing them while in an activated condition with two or more different quaternizing agents, step-wise, and in an alkaline medium. The Michael patent states that the employment of a single quaternizing agent in a two-step reaction produces no advantage. However, the highest salt-splitting capacity reported in the Michael patent for its quaternized products is 12.8 kilograins per cubic foot of resin (see column 3, lines 43–45).

The present invention provides highly-basic anion exchange resins having significantly superior capacities over those of the anion exchange resins produced in accordance with the three patents referred to hereinabove. The anion exchange resins of the present invention have salt-splitting capacities or basicity values in the order of 18.5 kilograins per cubic foot of resin and an ultimate capacity of 44.7 kilograins per cubic foot before being subjected to a quaternizing treatment and the subsequently quaternized resins may have a salt-splitting capacity of as high as 29.7 kilograins per cubic foot of resin. Thus the resins of the present invention possess superior salt-splitting capacities over those of three prior art patents without requiring a separate quaternization treatment. After being subsequently quaternized the salt-splitting capacity is enhanced even more. So far as is known, the anion exchange resins of this invention are the first of high basicity and high silica capacity which can be produced directly by condensation without requiring a separate quaternization or post-alkylation treatment.

The highly-basic anion exchange resins of the invention are produced by condensing an epihalohydrin with an alkylenepolyamine having at least one tertiary amino group and preferably at least one tertiary amino group and at least one primary amino group. The presence of at least one tertiary amino group is an essential substituent of the alkylenepolyamine. The tertiary amine groups are desirably dialkylamino groups, and preferably di-lower-alkylamino groups. Desirably, the condensation product may be subjected to a post-quaternization treatment with a quaternization or alkylating agent.

The highly-basic anion exchange resins of the present invention may also be produced by condensing an epihalohydrin with a mixture of an alkylenepolyamine having at least one tertiary amino group and a polyalkylenepolyamine, the latter having only primary and secondary amino groups as the amino groups. The resulting condensation product also possesses highly-basic anion exchange properties, although the resulting product is desirably subjected to treatment with a quaternization agent to enhance the salt-splitting, highly-basic properties of the condensation product.

I have found that epichlorohydrin is the most desirable of the epihalohydrins for use in preparing the anion exchange resins of the invention. Instead of epichlorohydrin, other agents may be used, such as epibromohydrin and substituted epihalohydrins, etc., and these are deemed to be equivalents of epichlorohydrin for this purpose.

The alkylenepolyamines having at least one tertiary amino group which are employed in producing the highly-basic anion exchange resins are desirably the lower alkylenepolyamines containing at least one tertiary amino group, such as dimethylaminopropylamine (N,N-dimethylpropylenediamine), diethylaminopropylamine (N,N-diethylpropylenediamine), N - morpholinopropylamine, dimethylaminoethylamine, diethylaminoethylamine, etc. Other alkylenepolyamines, containing at least one tertiary amino group and at least one secondary amino group may be employed, such as N,N-dimethyl-N'-methylpropylenediamine; N,N-diethyl-N'-methylpropylenediamine; N,N-dimethyl - N'-methylethylenediamine; N,N-diethyl - N'-ethylethylenediamine, etc. Dimethylaminopropylamine has been found to be particularly suitable.

Among the polyalkylenepolyamines having only primary and secondary amine groups which may be employed in conjunction with the above described alkylenepolyamines having a tertiary amine group are desirably the lower polyalkylenepolyamines, such as the polyethylenepolyamines, diethylenetriamine, triethylenetetramine, tetraethylenepentamine, etc., or a polypropylpolyamine, such as iminobispropylamine. Iminobispropylamine is particularly suitable.

Suitable quaternizing agents are the alkyl halides, such as methyl chloride, bromide and iodide, ethyl chloride, bromide and iodide, etc.; dialkyl sulfates, such as dimethyl, diethyl, dipropyl, dibutyl sulfates, epihalohydrins, such as epichlorohydrin; and alkyl esters of aryl sulfonates, such as methyl toluene sulfonate and methyl benzene sulfonate.

In producing the highly-basic anion exchange resins according to the invention, it is desirable to employ at least about 1 mole of epihalohydrin for each mole of alkylenepolyamine. It is also desirable that the amount of epihalohydrin, expressed in moles per mole of each alkylenepolyamine compound, shall not exceed the sum of 3 times the number of primary amine groups, 2 times the number of secondary amine groups, and 1 time the number of teritary amine groups in one molecule of each of the alkylenepolyamine compounds employed. Thus if 1 mole of dimethylaminopropylamine is used as the sole source of alkylenepolyamine, it is desirable to employ not more than 4 moles of epihalohydrin, since the alkylenepolyamine contains 1 primary amine group which will react with up to 3 moles of epihalohydrin and 1 tertiary amine group which will react with up to 1 mole of epihalohydrin. Similarly, if 1 mole of each of dimethylaminopropylamine and iminobispropylamine are employed, up to 4 moles of epihalohydrin may be employed for the dimethylaminopropylamine and up to 8 moles of epihalohydrin for the iminobispropylamine for a sum of up to about 12 moles of epihalohydrin. The iminobispropylamine contains 2 primary amine groups and 1 secondary group which will react with a total of up to 8 moles of epihalohydrin.

Where an alkylenepolyamine containing at least one tertiary amine group is employed as the sole source of amine, it is preferred to employ a molar ratio of at least 1.3–2.5 moles of epihalohydrin for each mole of said alkylenepolyamine. Where epichlorohydrin and dimethylaminopropylamine are employed, it is preferred to use about 1.3 to 2.0 moles of the former for each mole of the latter since the resulting product possesses optimum capacity for removing both strong and weak anions from aqueous solutions. When producing the condensation product of epichlorohydrin, dimethylaminopropylamine and iminobispropylamine, it is desirable to employ the following mole ratios: 2.0 to 3.0 : 0.5 to 1.5 : 0.25 to 0.75, respectively.

When a quaternizing agent is employed, it may be desirable to use a slight excess of the amount of the agent necessary to quaternize all of the non-quaternary ammonium nitrogen atoms, (i.e. primary, secondary and tertiary amine groups) of the condensed product. It is not obligatory to employ such an excess of quaternizing agent and much smaller amounts will produce a suitable product. Generally speaking, the greater the amount of quaternizing agent employed, the greater will be the number of non-quaternary nitrogen atoms which are quaternized.

The condensation of the epihalohydrin and alkylenepolyamine or mixed polyamines may be carried out in the presence of any solvent which does not react with the reactants or the reaction products. Examples of such solvents are water, methanol, ethanol, etc. After the condensate has been produced it is desirably ground to produce particles of the desired size and the particles dried. Where the product is quaternized this treatment is carried out by treating it with a quaternizing agent in a non-aqueous solvent, such as methanol, or in an aqueous solvent. It is preferred that the solvent be mildly alkaline.

According to one procedure for producing the products, there is first prepared an initial, partial condensate, or precondensate syrup, of an epihalohydrin and an aqueous solution of the alkylenepolyamine or mixture of polyamines. Polymerization is permitted to proceed to the point where a somewhat viscous syrup is produced. The partially condensed, slightly viscous product is then added, with agitation, to a hot, inert, organic liquid in which the partially condensed product is insoluble and which contains a surface active agent which tends to prevent or minimize the agglomeration or fusion of the desired globules or spheroidal particles which are formed as a result of rapidly stirring or agitating the mixture. The rate of agitation is predetermined to produce a desired particle size. The reaction mixture is heated, with agitation, until solid resin beads are formed as a result of further polymerization. The temperature of the mixture is increased to remove as much of the water contained in the precondensate syrup in the form of an azeotropic mixture with the organic liquid. Heating is then continued to permit the complete polymerization of the resin condensate. The organic liquid is then drained from the spheroids or beads and they are dried. The product may then be quaternized if desired.

In general, it is desired that the particles of anion exchange resin shall be of such size that the bulk of the material will pass through a U.S. standard sieve series 10-mesh screen but will be retained by a U.S. standard sieve series 60-mesh screen. Preferably the particles should be within a range of 20- to 50-mesh size.

For the purposes of anion exchange it is necessary to first convert the quaternary ammonium anion exchange resin of the present invention to the hydroxide exchanging condition by treating the anion exchange resin with a dilute alkali, such as a 5% aqueous solution of sodium hydroxide.

This invention also comprises the process for removing anions from an aqueous solution, comprising contacting the aqueous solution with the novel basic anion exchange resins of the present invention. The anion exchange resin of the invention should be present in sufficient quantity to remove substantially all of the anions from the aqueous solution. This may be done by passing the aqueous solution through a column packed with the anion exchange resins. Adsorbed anions may be removed from the resin and the resin thus regenerated by washing it with dilute alkali, preferably sodium hydroxide, the alkali being such that it will form a soluble salt with the adsorbed anions.

In order to disclose more clearly the nature of the present invention, specific examples illustrating the preparation of the anion exchange resins of the present invention will hereinafter be described. This is done solely by way of example and is intended neither to delineate the scope of the invention nor to limit the ambit of the appended claims.

EXAMPLE 1

Into a reaction vessel equipped with a stirrer, thermometer and dropping funnel were placed 318 ml. of water and about 123.5 grams of dimethylaminopropylamine. The resulting mixture was stirred and cooled to 30° C. with a surrounding ice bath. To this solution there were added dropwise about 168.5 grams of epichlorhydrin during 45 minutes keeping the temperature below 40° C. The molar ratio of epichlorohydrin to dimethylaminopropylamine was 1.5:1. Into a glass resin flask equipped with a stirrer, thermometer and distillation head were placed 1400 ml. of commercial orthodichlorobenzene containing 1% by weight of chlorinated rubber. The previously prepared condensate was poured into this suspending medium and allowed to separate. Mechanical stirring was begun at a previously defined stirrer speed to produce a maximum size distribution of between −30 and +50 mesh. The mixture was heated with a surrounding oil bath. When the temperature reached 105° C., an azeotropic mixture of water and orthodichlorobenzene began to distill. Distillation was continued at 105° C. until most of the water had been removed. At this point all of the beads were well defined. Heating was continued until the temperature reached 125° C. and continued at this temperature for an additional 3 hours. The mixture was cooled, the resin beads filtered from the suspending medium and then suspended into a liter of water containing 150 grams of commercial lime. The mixture was then steam distilled with live steam for about 3–4 hours until all of the orthodichlorobenzene was removed. The material was washed with water to remove all of the lime. Upon regenerating the hard transparent beads, whose screen size was such that approximately 95% by volume was retained on 40-mesh screen, with dilute aqueous sodium hydroxide solution, the product was found to have a basicity value of 18.5 kgr./cu. ft.; an ultimate capacity of 44.7 kgr./cu. ft.; a density of 290 grams/liter and an operating capacity of 18.3 kgr./cu. ft. using a regeneration dosage of 6 lbs./cu. ft. of sodium hydroxide as a 5% aqueous solution.

EXAMPLE 2

The entire mixture of unwashed resin beads produced in Example 1 with its accompanying suspension of lime was then introduced into a 4-liter stainless steel autoclave equipped with a propeller agitator, a gas inlet tube, a thermometer, a gas release valve and an external source of heat. The resin beads were then treated with 150 grams of gaseous methyl chloride at 50° C. at 50–60 p.s.i. pressure. After the addition of the measured amount of methyl chloride the mixture was cooled and removed from the autoclave. The material was acidified with hydrochloric acid until a pH of 3–4 was reached. Upon regenerating the hard translucent beads, having a screen size such that approximately 95% by volume was retained on a 40-mesh screen, with dilute sodium hydroxide solution, the quaternized resin had a basicity value of 23.1 kgr./cu. ft.; an ultimate capacity of 34.0 kgr./cu. ft.; a density of 265 grams/liter and an operating capacity of 24.2 kgr./cu. ft. using a regeneration dosage of 6 lbs./cu. ft. of sodium hydroxide as a 5% aqueous solution with an influent water containing 200 p.p.m. of free mineral acids and 17 p.p.m. of silica.

EXAMPLE 3

Employing the same procedure as in Example 1 but using 119 grams of dimethylaminopropylamine in 318 ml. of water and using 173 grams of epichlorohydrin, a precondensate syrup was prepared. The molar ratio of epichlorohydrin to dimethylaminopropylamine was 1.6:1. The entire precondensate syrup was added to 1400 ml. of commercial orthodichlorobenzene which contained 1% by weight of chlorinated rubber and a resin was obtained as described in Example 1. The resin beads which were obtained had a basicity value of 20.3 kgr./cu. ft.; an ultimate capacity of 34.6 kgr./cu. ft.; and a density of 298 grams/liter. The operating capacity was found to be 22.9 krg./cu. ft. when employing a regeneration solution containing 6 pounds of sodium hydroxide as a 5% aqueous solution for each cubic foot of resin with influent water containing 200 p.p.m. of free mineral acids and 17 p.p.m. of silica.

EXAMPLE 4

Into a reaction vessel equipped with a stirrer, thermometer and dropping funnel were placed about 318 ml. of water and a mixture of 48 grams of iminobispropylamine and 75 grams of dimethylaminopropylamine. The resulting solution was stirred and cooled to 30° C. using a surrounding ice bath. To this solution there was added dropwise 169 grams of epichlorohydrin during 1 hour keeping the temperature below 40° C. The molar ratio of epichlorohydrin to dimethylaminopropylamine to iminobispropylamine was 2.5:1.0:0.5, respectively. Into a glass resin flask equipped with a stirrer, thermometer, distillation head were placed 1400 ml. of commercial orthodichlorobenzene containing 1% by weight of chlorinated rubber. The previously prepared condensate was poured into the suspending medium and allowed to separate. Mechanical stirring was begun at 170 r.p.m. to produce the maximum size distribution of between −30 and +50 mesh. The mixture was heated with a surrounding oil bath. When the mixture reached 105° C. an azeotropic mixture of water and orthodichlorobenzene began to distill. Distillation was continued at 105° C. until most of the water had been removed. At this point all of the beads were definitely defined. The heating was continued until the temperature reached 125° C. and continued at this temperature for an additional 3 hours. The mixture was cooled, the resin beads filtered from the suspending medium and the resin beads then suspended into a liter of water containing 150 grams of commercial lime. The mixture was then steam distilled with live steam for about 3–4 hours until all of the orthodichlorobenzene was removed. The entire mixture of the resin beads and lime water was then introduced into a 4-liter stainless steel autoclave equipped with a propeller-type agitator, a gas inlet tube, thermometer, a gas release valve and an external source of heat. The mixture was then quaternized with 135 grams of gaseous methyl chloride at 50° C. and at 50–60 p.s.i. pressure. After the addition of the measured amount of methyl chloride the mixture was cooled and removed from the autoclave. The material was acidified with hydrochloric acid until a pH of 3–4 was reached. Upon regenerating the hard translucent beads, the screen size being such that approximately 95% by volume was retained on a 40-mesh screen, with dilute sodium hydroxide solution, the quaternized resin had a basicity value of 26.8 kgr./cu. ft.; an ultimate capacity of 42 kgr./cu. ft.; a density of 320 grams/liter; and an operating capacity of 24.0 kgr./cu. ft. using a regeneration dosage of 6 lbs./cu. ft. of sodium hydroxide as a 5% aqueous solution as the regenerant and an influent feed water of 200 p.p.m. free mineral acid and 17 p.p.m. of silica.

EXAMPLE 5

Into a reaction vessel equipped with a stirrer, thermometer and dropping funnel were placed about 318 ml. of water and a mixture of 45 grams of iminobispropylamine and 70 grams of dimethylaminopropylamine. The resulting solution was stirred and cooled to 30° C. using a surrounding ice bath. To this solution there were added drop-wise 177 grams of epichlorohydrin during 1 hour keeping the temperature below 40° C. The molar ratio of epichlorohydrin to dimethylaminopropylamine to iminobispropylamine was 2.8:1.0:0.5, respectively. Into a glass resin flask equipped with a stirrer, thermometer and distillation head were placed 1400 ml. of commercial orthodichlorobenzene containing 1% by weight of chlorinated rubber (sold under the trademark "Parlon"). The previously prepared condensate was poured into the suspending medium and allowed to separate. Mechanical stirring was begun at 160 r.p.m. to produce the maximum size distribution of between −30 and +50 mesh. The mixture was heated with a surrounding oil bath. When the mixture reached 105° C. an azeotropic mixture of water and orthodichlorobenzene began to distill. Distillation was continued at 105° C. until most of the water had been removed. At this point all of the beads were definitely defined. The heating was continued until the temperature reached 125° C. and continued at this temperature for an additional 3 hours. The mixture was cooled, the resin beads filtered from the suspending medium and the resin beads then suspended in a liter of water containing 150 grams of commercial lime. The mixture was then steam distilled with live steam for about 3–4 hours until all of the orthodichlorobenzene was removed. The entire mixture of the resin beads and lime water was then introduced into a 4-liter stainless steel autoclave equipped with a propeller-type agitator, a gas inlet tube, thermometer, a gas release valve and an external source of heat. The mixture was then quaternized with 135 grams of gaseous chloride at 50° C. and at 50–60 p.s.i. pressure. After the addition of the measured amount of methyl chloride, the mixture was cooled and removed from the autoclave. The material was acidified with hydrochloric acid until a pH of 3–4 was reached. Upon regenerating the hard translucent beads with dilute sodium hydroxide solution, the screen size was such that approximately 95% by volume was retained on a 40-mesh screen and the resin had a basicity value of 29.7 kgr./cu. ft.; an ultimate capacity of 47.7 kgr./cu. ft.; a density of 370 grams/liter; and an operating capacity of 32 kgr./cu. ft. with a regeneration dosage of 6 lbs./cu. ft. of sodium hydroxide as a 5% aqueous solution using an influent feed water of 200 p.p.m. free mineral acid and 17 p.p.m. of silica.

EXAMPLE 6

Into a reaction vessel equipped with a stirrer, thermometer and a dropping funnel were placed 128 mil. of water and 49.5 grams of dimethylaminopropylamine. The resulting mixture was stirred and cooled to 30° C. by means of a surrounding ice bath. To this solution there were added drop-wise about 100 grams of epibromohydrin during 45 minutes keeping the temperature below 40° C. The molar ratio of epibromhydrin to dimethylaminopropylamine was 1.5:1. Into a glass resin flask equipped with a stirrer, thermometer and distillation head were placed 563 ml. of commercial orthodichlorobenzene containing 1% by weight of chlorinated rubber. The previously prepared condensate was poured into the suspending medium and allowed to separate. Mechanical stirring was begun at approximately 200 r.p.m. to produce a miximum size distribution of between −30 and +50 mesh. The mixture was heated with a surrounding oil bath. When the temperature reached 105° C., an azeotropic mixture of water and orthodichlorobenzene began to distill. Distillation was continued at 105° C. until most of the water had been removed. At this point all of the beads had been well defined. Heating was continued until the temperature reached 125° C. and continued at this temperature for an additional 3 hours. The mixture was cooled, the resin beads filtered from the suspending medium and then suspended into 500 ml. of water containing 75 grams of commercial lime. The mixture was then steam distilled with live steam for about 3–4 hours until all of the orthodichlorobenzene was removed. The entire mixture of the resin beads and lime water was then introduced into a 4-liter stainless steel autoclave equipped with a propeller type agitator, gas inlet tube, theremometer, gas release valve and exterior source of heat. The mixture was then quaternized with 117 grams of gaseous methyl chloride at 50° C. and at 50–60 p.s.i. pressure. After the addition of the measured amount of methyl chloride, the mixture was cooled and removed from the autoclave. The material was acidified with hydrochloric acid until a pH of 3–4 was reached. Upon regenerating the hard translucent beads, whose screen size was such that 95% by volume was retained on +40 mesh screen, with dilute sodium hydroxide solution, the quaternized resin had a basicity value of 20.0 kgr./cu. ft.; an ultimate capacity of 33.1 kg./cu. ft.; a density of 330 grams/liter; and an operating capacity of 24.0 kg./cu. ft. with a regeneration dosage of 6 lbs. of sodium hydroxide for each cubic ft. of resin at 5% aqueous solution and influent feed water of 200 p.p.m. free mineral acid and 17 p.p.m. of silica.

EXAMPLE 7

Into a reaction vessel equipped with a stirrer, thermometer and a dropping funnel were placed about 252 grams of water and a mixture of 30.5 grams of iminobispropylamine and 80 grams of N-dimethylaminopropyl, N'-diethylethylenediamine. The resulting mixture was stirred and cooled to 30° C. with a surrounding ice bath. To this solution there were added 120 grams of epichlorohydrin during 1 hour keeping the temperature below 40° C. The molar ratio of epichlorohydrin to N-dimethylaminopropyl, N'-diethylethylenediamine to iminobispropylamine was 2.8:0.86:0.5, respectively. Into a glass resin flask equipped with a stirrer, thermometer and distillation head were placed 1400 ml. of commercial orthodichlorobenzene containing 1% by weight of chlorinated rubber. The previously prepared condensate was poured into the suspending medium and allowed to separate. Mechanical stirring was begun at 120 r.p.m. to produce the maximum size distribution of between −30 and +50 mesh. The mixture was heated with a surrounding oil bath. When the temperature reached 105° C., an azeotropic mixture of water and orthodichlorobenzene began to distill. Distillation was continued at 105° C. until most of the water had been removed. At this point all of the beads had been well defined. Heating was continued until the temperature reached 125° C. and continued at this temperature for an additional 3 hours. The mixture was cooled, the resin beads filtered from the suspending medium and then suspended into 500 ml. of water containing 75 grams of commercial lime. The mixture was then steam distilled with live steam for about 3–4 hours until all the orthodichlorobenzene was removed. The material was washed with water to remove all of the lime. Upon regenerating the hard translucent beads, whose screen size was such that approximately 95% by volume was retained on +40 mesh screen, an operating capacity of 22.5 kgr./cu. ft. was obtained using a regeneration dosage of 6 lbs. of sodium hydroxide per cu. ft. of resin as a 5% aqueous solution and an influent feed water containing 200 p.p.m. of free mineral acid and 17 p.p.m. of silica.

Evaluation tests

Certain data are given for the products prepared in the above examples which are of value in assessing the usefulness of highly-basic anion exchange resins. The methods used for determining those values which are not the subject of standardized tests are described below.

As used in the examples and elsewhere in this specification, the term "basicity value" (sometimes referred to as "salt-splitting capacity") is a measure of the capacity of the anion exchange resin to remove the anions of weak acids. Since the value of a highly-basic anion exchange resin may often reside in its ability to remove the anions of weak acids, as well as those of strong acids, this is an important value in determining the performance of any basic anion exchange resin. As expressed here, this value is obtained by passing 270 ml. of a 0.75 normal sodium hydroxide solution through a 16 mm. column containing 40 ml. of the anion exchange resin at a flow rate of approximately 5 ml. per minute. This places the anion exchange resin of polymerizate in the hydroxide exchanging condition. The resin bed is rinsed as free as possible of phenolphthalein alkalinity with distilled water. 750 ml. of 0.5 normal sodium chloride solution is next passed through the resin bed at a flow rate of 7.5 ml. per minute. The column is washed with distilled water. The effluent and washings from the sodium chloride treatment are collected, mixed and titrated with 0.02 normal sulfuric acid solution to a methyl orange endpoint. Since the strongly-basic anion exchange resin will remove chloride ion from the sodium chloride solution and convert sodium chloride to sodium hydroxide, this determination permits the calculation of the sodium chloride converted to sodium hydroxide giving the "basicity value" of the anion exchange resin. This sodium chloride splitting value is expressed in kilograins of calcium carbonate per cubic foot of anion exchange resin. Resins having a high "basicity value" will have a high capacity for the removal of weak acids, such as silicic acid and carbonic acid from solutions.

The term "ultimate capacity" used in the examples and elsewhere in the specification is determined by placing 40 ml. of resin, which has first been placed in the chloride form by passing an excess solution of dilute hydrochloric acid over the resin followed by washing with water, in a column of 16 mm. size and through this column is passed 1000 ml. of 0.75 normal sodium hydroxide at the rate of 5 ml./min. The resin bed is then washed free of phenolphthalein alkalinity with distilled water. Next 800 ml. of a 0.25 normal hydrochloric sulfuric acid solution (a ratio of 1.5 parts of hydrochloric to 2.5 parts of sulfuric) is passed through the resin bed at a flow rate of 10 ml./min. Next 700 ml. of distilled water is passed through the tube. The effluent is collected and mixed and an aliquot is titrated to determine the residual acid. From this, the total amount of acid adsorbed may be computed in terms of kgr./cu. ft. of calcium carbonate which gives the total or ultimate capacity of the resin.

Unless otherwise stated, reference to parts and quantities of materials is intended to be expressed in terms of weight.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

What is claimed is:

1. A water-insoluble, highly-basic anion exchange resin comprising a condensate of an epihalohydrin and an alkylenepolyamine, the latter having at least one tertiary amino group the molecular ratio of epihalohydrin to alkylenepolyamine being at least about 1:1, respectively.

2. A water-insoluble, highly-basic anion exchange resin as defined by claim 1, wherein the epihalohydrin is epichlorohydrin.

3. A water-insoluble, highly-basic anion exchange resin as defined by claim 1, wherein the alkylenepolyamine also contains at least one primary amino group.

4. A water-insoluble, highly-basic anion exchange resin as defined by claim 1, wherein the alkylenepolyamine is employed in admixture with a polyalkylenepolyamine having only primary and secondary amino groups.

5. A water-insoluble, highly-basic anion exchange resin as defined by claim 1, wherein the condensate is quaternized with a quaternizing agent.

6. A water-insoluble, highly-basic anion exchange resin as defined by claim 4, wherein the condensate is quaternized with a quaternizing agent.

7. A water-insoluble, highly-basic anion exchange resin as defined by claim 5, wherein the quaternizing agent is methyl chloride.

8. A water-insoluble, highly-basic anion exchange resin as defined by claim 1, wherein the molecular ratio of epihalohydrin to alkylenepolyamine employed in producing the condensate is between about 1.3 to 2.5:1, respectively.

9. A water-insoluble, highly-basic anion exchange resin as defined by claim 1, wherein the molecular ratio of epihalohydrin to alkylenepolyamine employed in producing the condensate is at least about 1.3 to 2.5, respectively.

10. A water-insoluble, highly-basic anion exchange resin as defined by claim 1, wherein the epihalohydrin is employed in an amount of at least about 1 mole for each mole of alkylenepolyamine and in an amount expressed in moles per mole of each alkylenepolyamine compound, not in excess of the sum of 3 times the number of primary amine groups, 2 times the number of secondary amine groups, and 1 time the number of tertiary amine groups in one molecule of each of the alkylenepolyamine compounds employed.

11. A water-insoluble, highly-basic anion exchange resin as defined by claim 1, wherein the alkylenepolyamine is dimethylaminopropylamine.

12. A method of removing anions from solutions, which comprises bringing such solutions into contact with the anion exchange resin defined by claim 1.

13. A method of removing anions from solutions, which comprises bringing such solutions into contact with the anion exchange resin defined by claim 4.

14. A process for preparing a water-insoluble, highly-basic anion exchange resin, which comprises condensing an epihalohydrin and an alkylenepolyamine, the latter having at least one tertiary amino group the molecular ratio of epihalohydrin to alkylenepolyamine being at least about 1:1, respectively.

15. A process for preparing a water-insoluble, highly-basic anion exchange resin, which comprises condensing an epihalohydrin and a mixture of an alkylenepolyamine having at least one tertiary amine group and a polyalkylenepolyamine having only primary and secondary amine groups the molecular ratio of epihalohydrin to alkylenepolyamine being at least about 1:1, respectively.

16. A process as defined by claim 14 for preparing a water-insoluble, highly-basic anion exchange resin, wherein the molecular ratio of epichlorohydrin to alkylenepolyamine employed in producing the condensate is between about 1.3 to 2.5:1, respectively.

17. A process as defined by claim 14 for preparing a water-insoluble, highly-basic anion exchange resin, wherein the epihalohydrin is employed in an amount of at least about 1 mole for each mole of alkylenepolyamine and in an amount expressed in moles per mole of each alkylenepolyamine compound, not in excess of the sum of 3 times the number of primary amine groups, 2 times the number of secondary amine groups, and 1 time the number of tertiary amine groups in one molecule of each of the alkylenepolyamine compounds employed.

18. A process as defined by claim 14 for producing a water-insoluble, highly-basic anion exchange resin, wherein the product is subsequently treated with a quaternizing agent.

References Cited in the file of this patent

UNITED STATES PATENTS

| 2,393,825 | Senkus | Jan. 29, 1946 |
| 2,469,683 | Dudley | May 10, 1949 |
| 2,543,666 | Michael | Feb. 27, 1951 |
| 2,599,974 | Carpenter | June 10, 1952 |

FOREIGN PATENTS

| 634,943 | Great Britain | Mar. 29, 1950 |
| 652,830 | Great Britain | May 2, 1951 |

UNITED STATES PATENT OFFICE
CERTIFICATE OF CORRECTION

Patent No. 2,898,310                                              August 4, 1959

Albert H. Greer

It is hereby certified that error appears in the printed specification of the above numbered patent requiring correction and that the said Letters Patent should read as corrected below.

Column 2, line 56, for "on tertiary" read -- one tertiary --; column 3, line 45, for "teritary" read -- tertiary --; column 7, line 55, for "a miximum" read -- the maximum --; column 8, line 9, for "33.1 kg./cu. ft." read -- 33.1 kgr./cu. ft. --; line 10, for "24.0 kg./cu. ft." read -- 24.0 kgr./cu. ft. --; line 12, for "at 5%" read -- as a 5% --.

Signed and sealed this 19th day of January 1960.

(SEAL)
Attest:

KARL H. AXLINE                                             ROBERT C. WATSON
Attesting Officer                                       Commissioner of Patents